(12) United States Patent
Howard

(10) Patent No.: US 6,530,585 B1
(45) Date of Patent: Mar. 11, 2003

(54) VEHICLE STEERING STABILIZER WITH DETENT RAMP IN ROTARY PLATE

(76) Inventor: Durrell U Howard, 306 Krameria Dr., San Antonio, TX (US) 78213

(*) Notice: Subject to any disclaimer, the term of this patent is extended or adjusted under 35 U.S.C. 154(b) by 0 days.

(21) Appl. No.: 09/992,752

(22) Filed: Nov. 16, 2001

(51) Int. Cl.$^7$ .................................. B62D 9/00

(52) U.S. Cl. .................................. 280/89.11; 74/527

(58) Field of Search .............. 280/89.11, 89.1, 280/89, 89.12, 89.13, 90; 74/495, 527, 531

(56) References Cited

U.S. PATENT DOCUMENTS

| | | |
|---|---|---|
| 2,509,570 A | 5/1950 | Lee |
| 2,760,518 A | 8/1956 | Peet |
| 3,075,576 A | 1/1963 | Herbert |
| 3,169,551 A | 2/1965 | Lewis |
| 3,230,975 A | 1/1966 | Mercier |
| 3,318,251 A | 5/1967 | Smith |
| 3,730,307 A | 5/1973 | Mitchell |
| 3,756,367 A | 9/1973 | Mitchell et al. |
| 3,792,721 A | 2/1974 | Zahid |
| 3,857,413 A | 12/1974 | Zahid |
| 3,863,947 A | 2/1975 | Weston |
| 3,870,335 A | 3/1975 | Schultz |
| 3,882,953 A | 5/1975 | Maisch |
| 3,882,954 A | 5/1975 | Inoue |
| 3,887,027 A | 6/1975 | Allison |
| 3,897,846 A | 8/1975 | Inoue |
| 3,958,656 A | 5/1976 | Niemann |
| 3,960,179 A | 6/1976 | Zahid |
| 3,961,646 A | 6/1976 | Schon |
| 4,008,782 A | 2/1977 | Chanal |
| 4,088,154 A | 5/1978 | Patton et al. |
| 4,349,079 A | 9/1982 | Leiber |
| 4,359,123 A | 11/1982 | Haupt et al. |
| 4,410,193 A | 10/1983 | Howard |
| 4,418,931 A | 12/1983 | Howard |
| 4,467,884 A | 8/1984 | Robertson et al. |
| 4,503,678 A | 3/1985 | Wimbush |
| 4,506,507 A | 3/1985 | Wimbush |
| 4,534,577 A | 8/1985 | Howard |
| 4,558,878 A | 12/1985 | Motrenec |
| 4,566,712 A | 1/1986 | Motrenec |
| 4,585,400 A | 4/1986 | Miller |

(List continued on next page.)

FOREIGN PATENT DOCUMENTS

DE 1901588 8/1970

*Primary Examiner*—Peter C. English
(74) *Attorney, Agent, or Firm*—Townsend M Belser, Jr.; Nexsen Pruet Jacobs & Pollard LLC

(57) ABSTRACT

A steering stabilizer apparatus for the steering system of a vehicle having a steerable member movable away from a selected center position in response to a steering movement. The apparatus includes a rotary member having a corresponding face with centering detents, a piston member having a corresponding face arranged opposite to the rotary member face with a centering detent aligned with each rotary member detent when the rotary member is in a centered position corresponding to the selected position of the steerable member. Bearing members are arranged to be pressed between the rotary and piston members and to be in contact with a seat of each of a pair of aligned detents when the steerable member is in the preselected position. The rotary member is rotated relative to the piston member in response to movement of the steerable member. A fluid system causes the piston and rotary members to be pressed together so that contact pressure between the bearing members and the seats of the aligned centering detents resists relative movement between the rotary member and the piston member and prevents movement of the steerable member away from the selected position until the steering force exceeds a predetermined value. Each of the detents include a ramp sloped outwardly from the seat to a track in the corresponding face, and the ramp is formed by a groove having substantially the same radius as the bearing member.

20 Claims, 10 Drawing Sheets

U.S. PATENT DOCUMENTS

| | | |
|---|---|---|
| 4,588,198 A | 5/1986 | Kanazawa et al. |
| 4,634,135 A | 1/1987 | Nakata et al. |
| 4,638,838 A | 1/1987 | Richard et al. |
| 4,722,545 A | 2/1988 | Gretz et al. |
| 4,828,063 A | 5/1989 | Ogura et al. |
| 4,872,486 A | 10/1989 | Sugimura et al. |
| 4,903,973 A | 2/1990 | Bray |
| 5,076,383 A | 12/1991 | Inoue et al. |
| 5,313,389 A | 5/1994 | Yasui |
| 5,527,053 A | 6/1996 | Howard |
| 5,536,028 A | 7/1996 | Howard |
| 5,816,594 A | 10/1998 | Howard |
| 6,003,887 A | 12/1999 | Howard |
| 6,065,561 A | 5/2000 | Howard |
| 6,267,395 B1 | 7/2001 | Howard |
| 6,272,947 B1 | 8/2001 | Howard |

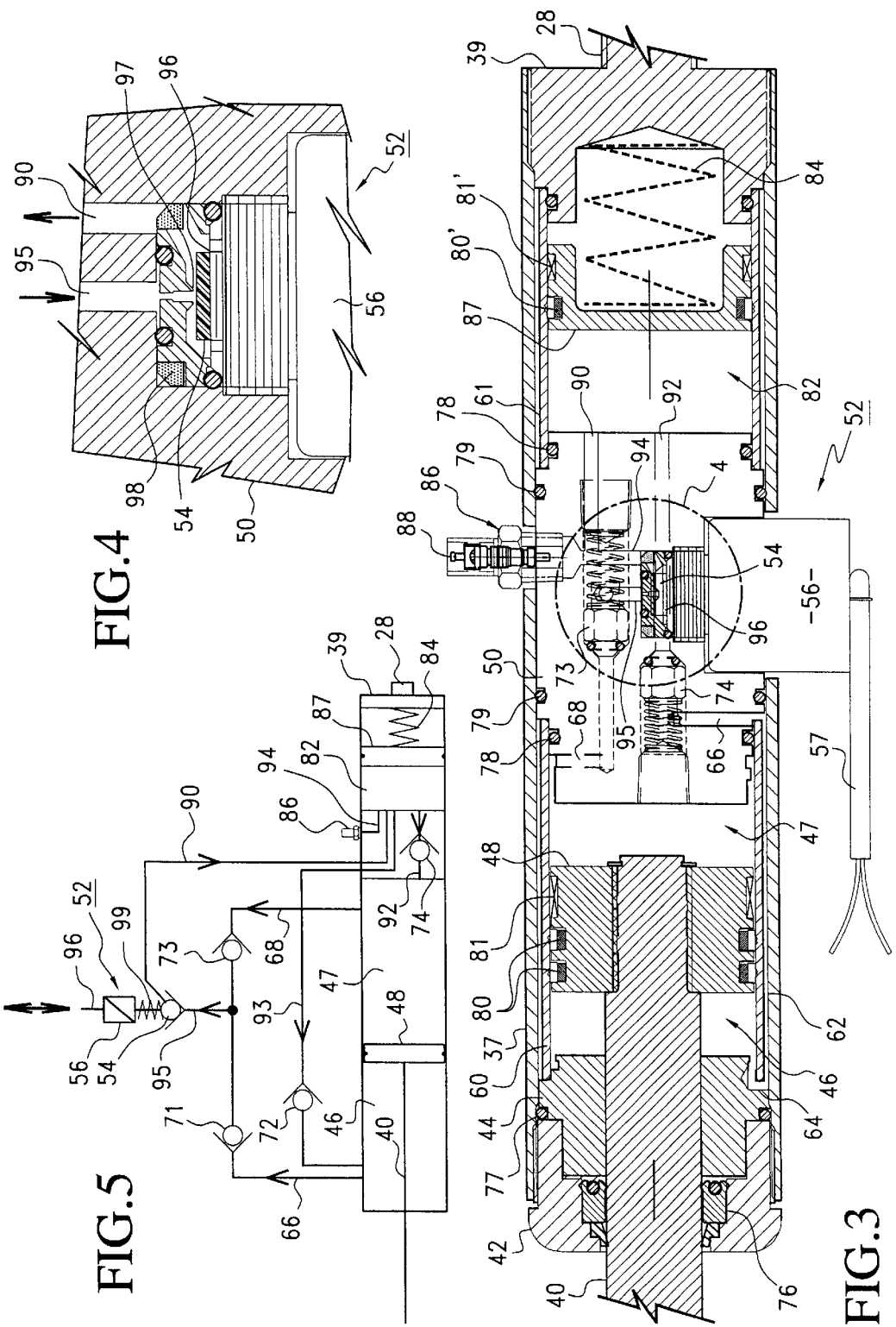

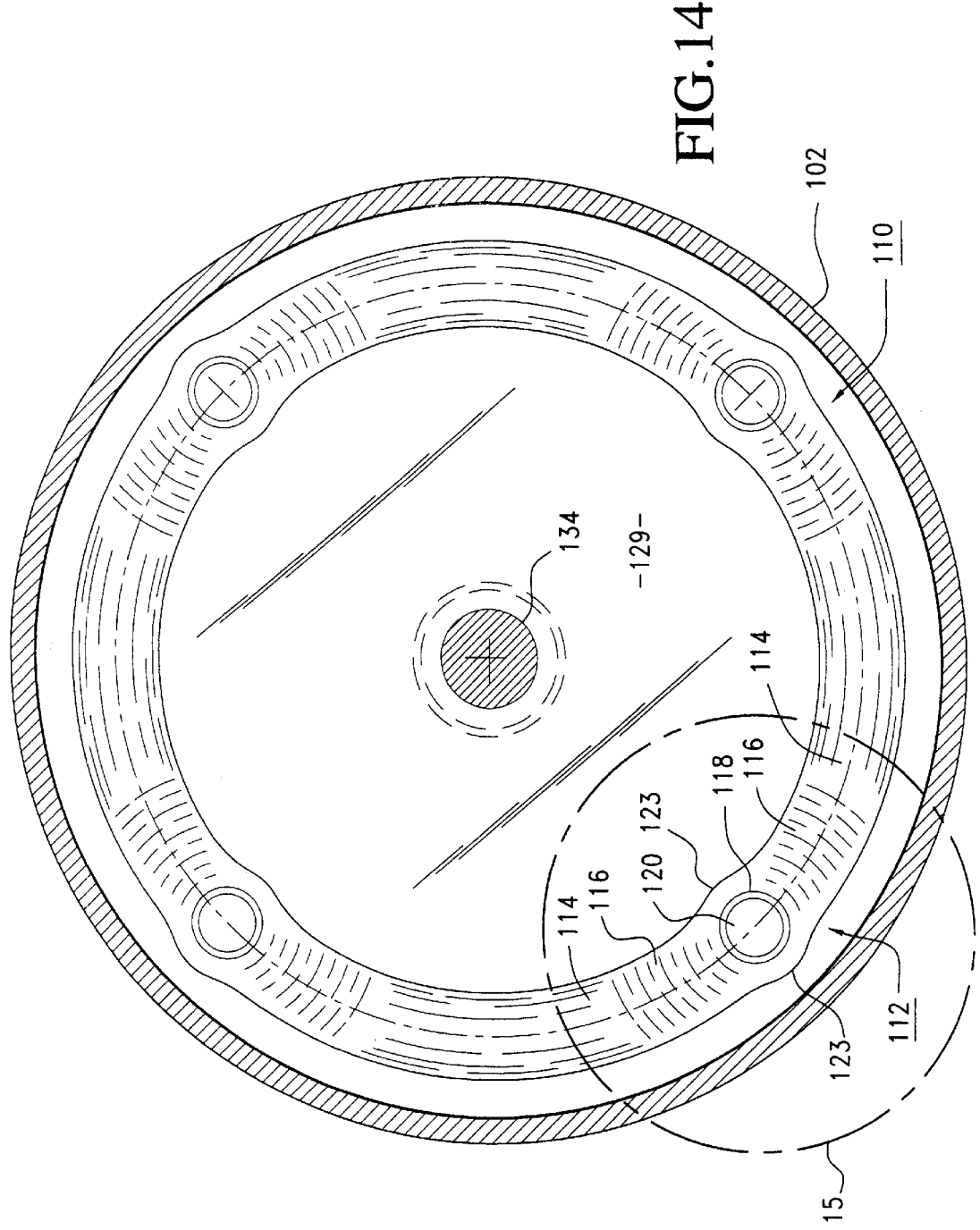

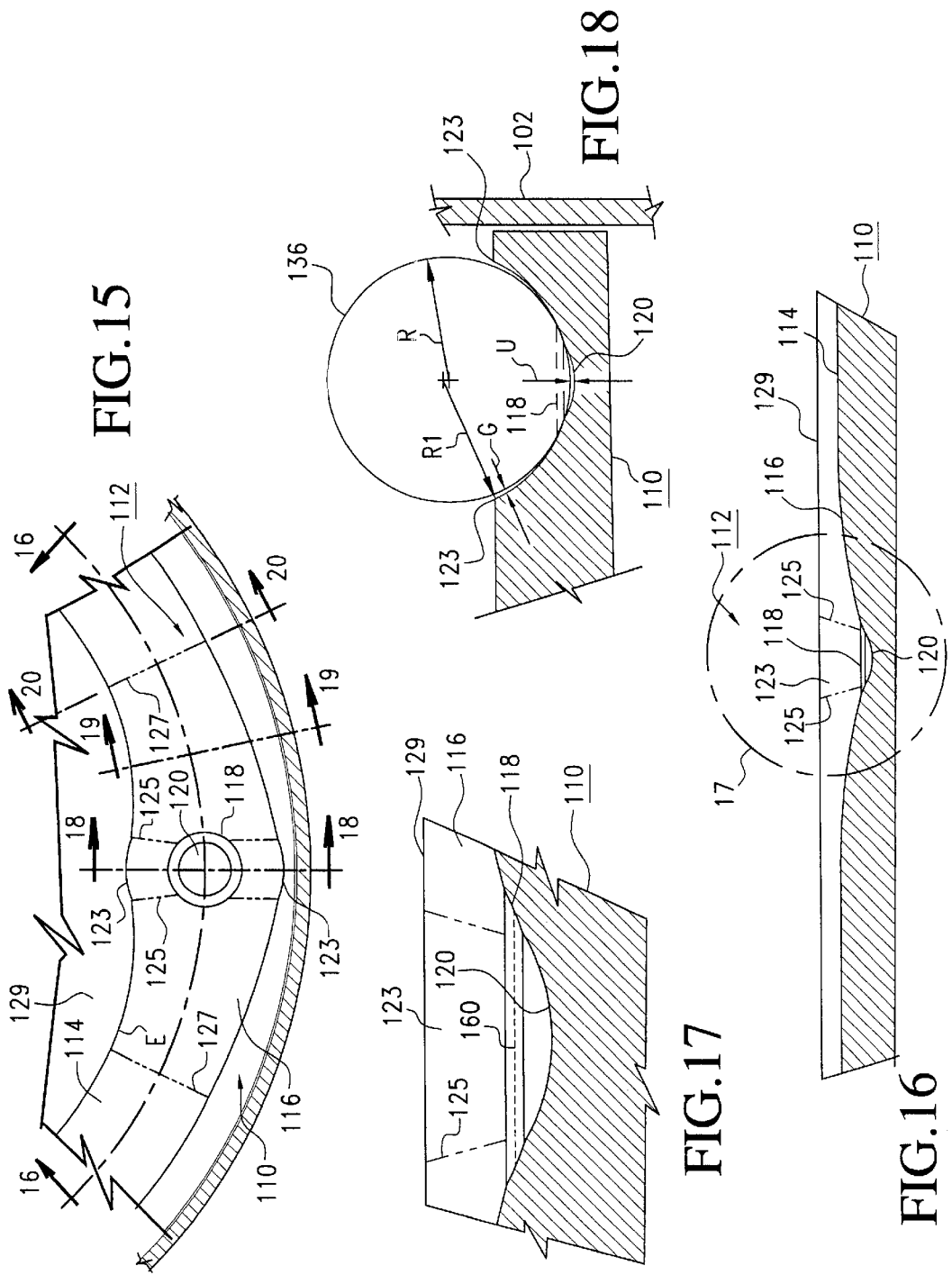

VEHICLE STEERING STABILIZER WITH DETENT RAMP IN ROTARY PLATE

FIELD OF THE INVENTION

This invention relates to vehicle steering systems and more particularly to a device for holding the steerable wheels of a vehicle, such as a motor home, bus, truck, automobile or the like, so that a center steering position is maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway vehicles and the like are designed primarily for driver a control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

Vehicles with steering systems having positive caster generally track relatively straight ahead and generally resist normal steering inputs away from center, including those of the driver. Intentional turning maneuvers by the driver therefore require sufficient turning force to overcome this positive resistance to movement away from center. When the driver relaxes the turning force applied to the steering wheel, a positive caster system has a definite tendency to return to its straight ahead position, although it may overshoot the neutral or center position if the steering wheel is entirely released.

While positive caster is desirable in some respects, it is not without compromises over the full steering spectrum. For example, the adverse effects of strong gusty cross winds are usually more pronounced with large amounts of positive caster. As its name would imply, the vehicle tends to caster towards the side of the roadway to which it is being pushed by the wind. Thus, the adverse steering inputs caused by crosswinds are directly related to the amount of positive caster offset, which is a classic example of having to balance a benefit with a detriment. The small amount of stability gained from castering the steerable wheels on a non-windy day may be paid for many times over when driving in a crosswind because of the destabilizing effect of the crosswind caused by positive caster offset. Positive caster offset also allows steering inputs from rutted and other imperfect roadway surfaces to steer back against the driver and thereby cause road wander, which is a universal driving complaint, particularly by driver's of heavy vehicles such as trucks and motor homes. Similarly, a high crown at the center of the roadway or a slanted roadway can cause vehicles to turn toward the edge of the roadway, that is, in the downhill direction. In addition, generous positive caster provides significant resistance to small radius turns, which can make city driving quite fatiguing. These adverse effects are some of the negative aspects of achieving steering stability through generous amounts of positive caster.

For the lack of a more advanced method, steerable wheel castering has been accepted by the industry as a low-cost method of achieving steerable wheel returnability. Accordingly, many over-the-road vehicles are provided with generous amounts of positive caster. Not much thought has been given to the self-defeating side effects of steerable wheel castering. The failure of the industry to recognize the critical need to provide directional stability by replacing steerable wheel castering with another method of achieving steerable wheel returnability may go down in history as one of the longest enduring vehicle design oversights.

Thus, a highly important consideration that has long been overlooked by the industry is that steerable wheel castering is directly responsible for road wander, crowned road steering wheel pull and cross wind steering problems. Keeping a vehicle tracking straight and under control currently requires an inordinate amount of driver steering corrections to counteract the adverse side effects of castered wheels. The repetitive task of making thousands of precise steering corrections mile after mile weighs heavily on a driver's physical and mental well-being, and may result in extreme driving fatigue. Thus, vehicle directional stability can best be achieved by stabilizing the on-center behavior of the steerable wheels with a more suitable method than the traditional steerable wheel castering used on many current production vehicles.

Another drawback of prior art steering systems is that spurious inputs transmitted from the roadway through the steerable wheels affect substantially the entire steering assembly before encountering any stabilizing resistance from the steering wheel. The transmission of these inputs between the steerable wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides a center stabilizer assembly for improved on-center holding of the steerable wheels, and significantly reduces driver fatigue because it results in a major reduction in driver steering inputs. The stabilizer assembly is easily activated by the driver while driving the vehicle, and its activation makes driving more pleasurable and less fatiguing. The stabilizer assembly comprises linkage means of variable length that extends between the steerable wheels and an axle or frame member such that the length of the linkage means defines the center position of the steering system. The linkage means comprises a resistance unit that provides a resistance force for resisting steering forces tending to move the steerable wheels to either side of the center position, and a trim unit for transmitting the steering forces to the resistance unit.

The trim unit comprises a trim piston, a trim cylinder providing first and second trim chambers, one on each side of the trim piston, a fluid transfer system for providing a flow of fluid to and from each of the trim chambers, and a solenoid operated valve for controlling the fluid flow. The control valve is operable between a closed position for preventing the fluid flow to hold the piston in a locked centering position, and an open position for allowing the piston to move to a new centering position in the trim cylinder. Movement of the trim piston causes fluid flow to one of the trim chambers and fluid flow from the other of the trim chambers. This fluid flow permits the length of the linkage assembly to change relatively freely in response to steering forces, which in turn permits the steerable wheels to move freely to a new center position in response to an applied steering force.

The resistance unit includes a component that moves with the steering system in response to steering wheel movement, and resistance to movement of this component provides a resistance force opposing relatively small movements of the steerable wheels to either side of their center position. These small movements correspond to the very large radius turns that occur when a vehicle is steered through maneuvers at highway speeds (as opposed to the small radius turns that occur when a vehicle turns a corner). Thus, during large radius turns, the resistance unit provides a resistance force that biases the steerable wheels back toward their center position, and this bias serves as a return force to return the steerable wheels to their center position upon removal of the steering force producing the large radius turn. On the other hand, during small radius turns, the resistance unit may be rendered ineffective to permit easy, away from center movements during such turns.

More specifically, the stabilizer has a pair of detent members with opposing faces, each with at least one centering detent. At least one bearing member is arranged to simultaneously contact rim bands around undercut portions of two opposing centering detents when a steerable member is in its preselected position. One of the detent members is connected to the steerable member and the other of these members is connected to the frame of the vehicle so that the bearing member and the detent members move relative to each other in response to movement of the steerable member away from its preselected position. A compressed spring is arranged to press the bearing member between the two opposing detent members so that sufficient contact pressure is maintained at all times to keep the bearing member firmly within the centering detent or in a groove defining a corresponding track in the face of each detent member for guiding the bearing member when it is moved outside of the detent. There are two tracks associated with each detent, one extending away in a direction opposite from the other. Each detent includes two sloped ramp segments each with one end adjacent to the centering detent and the other end fared into a corresponding one of the tracks, which may be flat (no slope) for providing substantially zero resistance or may have a gradually sloped (constant or changing) portion for providing a relatively small amount of resistance as described below. The ramp is also formed by a groove and the track and ramp grooves both have substantially the same radius of curvature as the bearing member so as to snugly fit and frictionally engage the bearing member to cause it to travel out of the detent, up the ramp, and along the track when the steering force exceeds a break away level of resistance.

There are preferably a plurality of bearings and a plurality of opposing of detent pairs, one pair being associated with each bearing. The pressing force between the bearing members and their centering detents resists relative movement between the bearing members and the detent members, and the pressing force provided by the compression spring is preferable supplemented by air pressure in a piston chamber adjacent one of the detent members that is in the form of a detent piston. Because the bearing and detent members are arranged between the steerable member and the frame of the vehicle, resistance to relative movement between these members prevents substantial movement of the steerable member away from its preselected center position until the steering force applied to the steering system exceeds a predetermined value corresponding to the level of break away resistance provided by the contact pressure between the bearing members and the centering detents.

The detent members are preferably opposing plates, namely a rotary plate arranged for rotary movement relative to a piston plate restrained from rotation. The bearing members are preferable a plurality of spherical ball bearings arranged in spaced relation to each other with a disc-like separator retaining this spaced relation. The bearings may have other shapes with curved outer surfaces, such as an oval shape. Each detent plate has a plurality of centering detents arranged relative to the bearing members and bearing retainer so that one of the bearings is received in each opposing pair of centering detents when the steering system is centered. The detents or depressions in each detent plate have a spaced relation corresponding to the spaced relation of the bearings. The bearings are pressed into the centering detents of the detent plates by a retaining spring to keep the plates and bearings in position and by means of air pressure in a cylindrical resistance chamber adjacent the piston plate, which serves as a reciprocating piston. The contact pressure between the bearing members and the detent plates, and thereby the resistance force, may be varied by varying the air pressure in the resistance chamber.

The invention also includes a feature for eliminating mechanical slack in the interaction between each bearing member and its corresponding centering detent. This slack-removal feature comprises providing each detent with an undercut bottom portion having a radius of curvature that is smaller than the radius of curvature of the bearing member. A narrow contact band may also be provided around the rim of the undercut portion. Although it may be slightly rounded by a convex shape, the width of this band extends generally along a line tangent to the curved surface of the bearing member, such that contact between the bearing member and the centering detent will occur substantially only along a line of contact. Where the transition between the rim of the undercut portion and the adjacent surface of the detent ramp would otherwise be relatively sharp, the contact band along which contact pressure occurs may be slightly convex (rounded) so as to minimize wear at the rim of the undercut portion. If this transition is relatively sharp, repeated travel of the bearing member over the rim may wear off the sharp edge in an uneven manner, resulting in intermittent bands of contact separated by areas of no contact. In each of these alternatives, contact between each bearing member and the rim of the undercut portion of its corresponding detent occurs along substantially a continuous line of contact.

The stabilizer includes means for remotely and selectively varying both the amount of resistance to movement away from center and the preselected position of the steerable member relative to the vehicle frame. Both of these remote adjustments can be made by the driver while the vehicle is in operation. A control system is employed for operating a solenoid and a pressure regulator and the switch and dial for actuating these devices are preferably located at the driver's station of the vehicle. The switch preferably has a toggle that is biased by a spring to the circuit opening position. These types of switches are closed only momentarily when the toggle is held in a depressed position against the spring bias. Thus, the solenoid is actuated only while the toggle is actually depressed. Release of the toggle opens the circuit and stops the adjustment at the point selected.

The level of resistance to movement away from center may be remotely adjusted either by such a manual control system operable by the driver or by a microprocessor control system responsive to the speed of the vehicle. Thus, the turning resistance of the present invention is readily adjustable to provide a low level at low speeds and a high level at speeds of about 35 mph or greater. In this regard, the centering stabilizer of the present invention is much less complex than prior art arrangements, such as those which combine high positive caster near the center position and complex power steering systems for varying the level of power assist from a low assist level for large radius turns to a high assist level for small radius turns.

The centering return force provided by positive wheel caster follows a force curve that may provide relatively little, if any, turning resistance in the straight ahead position or for large radius turns immediately adjacent to the straight ahead position. The bearings and detent plates are sized and the centering detents are sized and shaped or "cut" so as to provide a resistance force which blends with any return force provided by the normal geometry of the front end of a motor vehicle. The invention can increase substantially the turning resistance available at and immediately adjacent to either side of the straight ahead position of the steerable wheels. At greater turning angles (small radius turns), the resistance force provided by the invention preferably tapers off as positive caster return force increases. The turning resistance provided by the invention at or near the centered wheel position should be sufficiently large to resist spurious steering inputs generated either by the driver or by an overactive power steering system.

In a preferred embodiment, the shape of the centering detent and other stabilizer parameters are chosen so that a total break away steering force of at least 100 pounds, preferably at least 200 pounds, and more preferably at least 300 pounds must be applied to the tie rod in order to initiate break away turning movement of the steerable wheels at vehicle speeds above about 35 miles per hour. For city driving at vehicle speeds of about 35 miles per hour or less, the break away force required is preferably lowered to about 100 pounds, more preferably below about 50 pounds, at the tie rod. Where steerable wheels are provided with positive caster, which is usually the case with highway motor vehicles, the grooves in which the bearing members ride adjacent to the upper end of the ramp of the centering detents are shaped to form a neutral (no slope) cam surface which provides no further turning resistance. In other words, interaction between a bearing member and its corresponding detent in the detent member provides a decreasing level of resistance force as the steerable wheels move away from center, until the caster return force, which increases in proportion to turning angle with positive caster, is of sufficient magnitude to alone provide stabilizing resistance. However, the resistance force need not go to zero, but instead the slope of the track groove surfaces beyond the outer ends of the ramps may provide a resistance force effective over the entire range of turning angles, which for highway vehicles is usually limited to 45 degrees on either side of the straight ahead position (the "0" position). Preferably, there should be sufficient positive caster for the resistance force to be effective over the range of 0–10 degrees, more preferably 0–5 degrees and most preferably 0–3 degrees on either side of center.

The stabilizer is preferably connected between the steering system and the front axle or a nearby frame member of the vehicle in a position that allows the steerable member(s) to move through its full range of steering movements while providing sufficient leverage for the apparatus to resist movement of the steerable member away from the center position producing straight ahead travel of the vehicle. The steering system connection may be made to any steering system component providing appropriate range and leverage, such as a tie rod which joins the two front steerable wheels of a highway vehicle, or the pitman arm connected to the reduction gear. The frame connection may be made to any component serving as a fixed mounting relative to the steering system.

The invention may be used with steering systems having a reduction gear between the steering wheel and the steerable wheels. In this application, the stabilizer is preferably connected to the steering system at a location between the steerable wheels and the reduction gear so as to be unaffected by any slack in the reduction gear or in components and connections between the reduction gear and the steering wheel. It is therefore on the slow side of the reduction gear ratio. The invention thus provides a zero backlash center stabilizer assembly.

The level of steering force required to initiate or break-away into a steering movement away from center is sometimes referred to in this specification as the "break away resistance". Different levels of break away resistance and of resistance force may be appropriate to compensate for changes in the forces acting upon the vehicle. Thus, the resistance force provided by the invention may be increased or decreased to provide a level of force sufficient to overcome any spurious steering inputs and to suit driver road feel, particularly a feel of the steering wheel that lets the driver know when the steered wheels are beginning to move away from center and are closely approaching return to center. In other words, the invention provides a distinctive feel when approaching or leaving the center position. Thus, the sense of touch is added to the visual sense to aid control of the vehicle and reduce driver fatigue.

In the absence of the invention, spurious inputs to and/or mechanical slack in the steering assembly require almost constant manipulation of the steering wheel by the driver and make it almost impossible for the driver to hold the vehicle on a true straight ahead course. Use of the invention therefore permits a substantial reduction or elimination of the caster angle of vehicles with positive caster, thereby significantly reducing the crosswind effect and providing the driver with a positive touch control not heretofore attainable with positive caster. Positive stability is thereby achieved for previously unstable steering systems.

Although the present invention is particularly useful as a center stabilizer assembly for motor vehicles, it can be employed to hold the center position of any steerable member moveable to either side of a preselected position. For example, the stabilizer can keep an outboard motor centered so that a boat follows a straight course over the water in the presence of spurious steering forces produced by wind and wave action. The stabilizer can also be used to keep centered such steerable members as the rudders of ships or airplanes and the tongues of tandem trailers or railway cars. The stabilizer is useable with both power and non-powered steering systems, with the level of resistance forces provided usually being less for vehicles without power steering.

BRIEF DESCRIPTION OF THE DRAWINGS

The invention, both as to its structure and operation, may be further understood by reference to the detailed description below taken in conjunction with the accompanying drawings in which:

FIG. 3 is a horizontal cross section of the trim unit of FIG. 2;

FIG. 4 is an enlarged fragmentary view of the solenoid valve seat within the area identified by the broken line circle 4 in FIG. 3;

FIG. 5 is a diagrammatic illustration of the fluid passages and valves within the trim unit 7 of FIG. 3;

FIG. 14 is a plan cross-sectional view of the centering unit similar to FIG. 9, but with the balls and ball retainer removed to show the face of the piston plate;

FIG. 15 is an enlarged fragmentary view showing details of the piston plate face within the area identified by the broken line circle 15 in FIG. 14;

FIG. 16 is an elevational cross-sectional view of the piston plate as taken along line 16—16 of FIG. 15;

FIG. 17 is an enlarged fragmentary view showing details of one of the detents in the piston plate face within the area identified by the broken line circle 17 in FIG. 16;

FIG. 18 is an enlarged cross-sectional view of the piston plate face taken along line 18—18 in FIG. 15 and also shows a ball bearing member fully seated within an undercut seat segment of its detent;

DETAILED DESCRIPTION OF PREFERRED EMBODIMENTS

Figure 1:
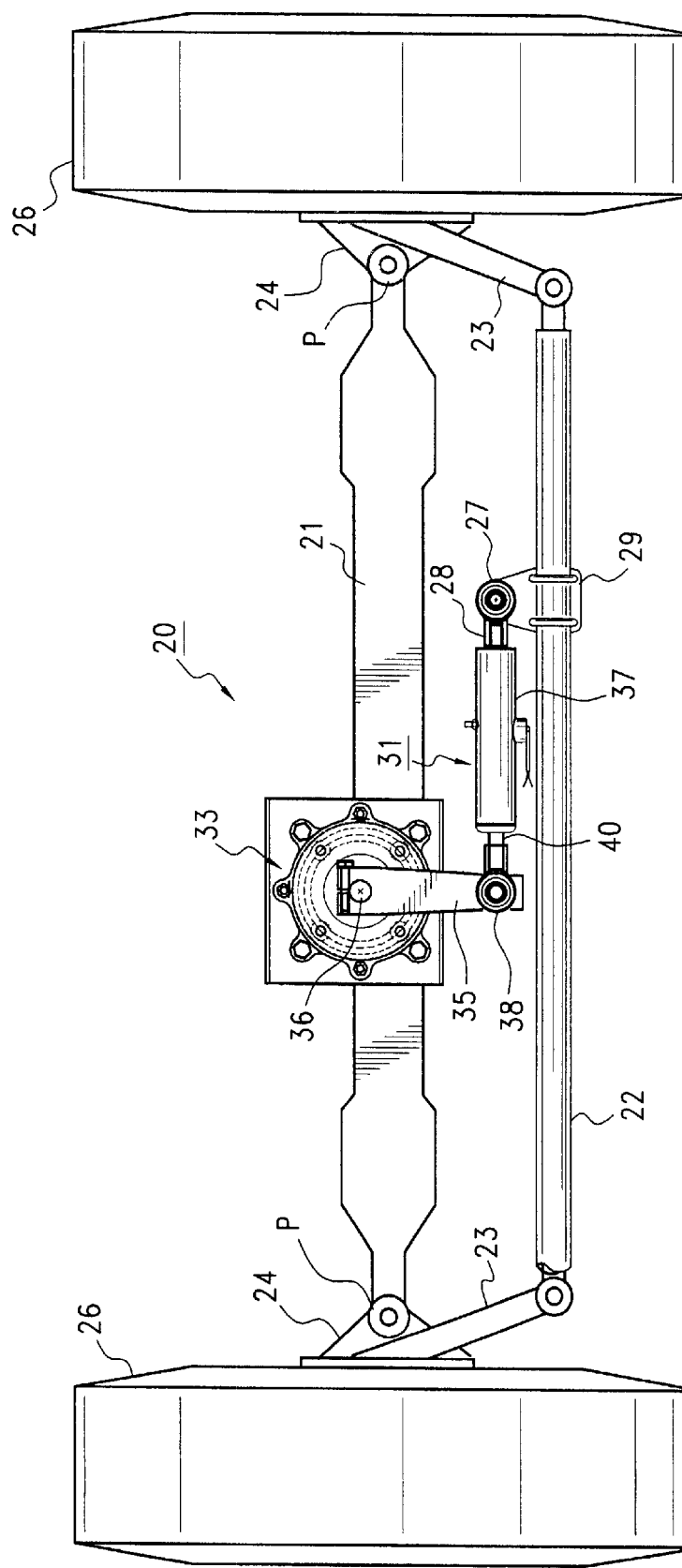
FIG. 1 is a plan view illustrating installation of the centering unit and the trim unit of the invention between the axle and the tie rod of a motor vehicle.

The steering stabilizer system of the present invention comprises a stabilizer assembly, generally designated 20, which may be connected between a front axle or other frame member 21 and the tie rod 22 of a conventional motor vehicle as shown in FIG. 1 of the drawings. The steering system components shown are conventional and include bell cranks 23, 23 carried by knuckles 24, 24, which support steerable wheels 26, 26 for pivotal turning movement about kingpins P,P mounted on the vehicle frame. Steering inputs by the driver are transmitted to the tie rod 22 by a Pittman arm (not shown) of the steering gear. The outer end of a centering rod 28 of stabilizer 20 is connected to the tie rod 22 by means of a ball joint 27 carried by a mounting bracket 29. As may be seen best in FIG. 2, the stabilizer includes a resistance unit 33, having a centering lever 35 with an inner end connected to a rotary shaft 36. The outer end of lever 35 is connected by a ball joint 38 to a trim unit 31 having a trim cylinder housing 37 housing a trim piston 48 carried by the inner end of a trim rod 40 as described further below. The trim unit 31 provides a remotely adjustable connecting linkage between the vehicle tie rod 22 and the centering lever 35 of the rotary centering unit 33. In other words, the centering arm 35 is held aligned with a centerline C by resistance means that opposes movement of this arm away from the centerline C. The resistance means referred to here is described in detail below. The trim rod 40 is extensible and contractible relative to trim housing 37 to provide remote adjustment of the center position of the steering system to be maintained by the stabilizer 20. This adjustment is accomplished by changing the length of the linkage between the ball joints 27 and 38.

Figure 2:
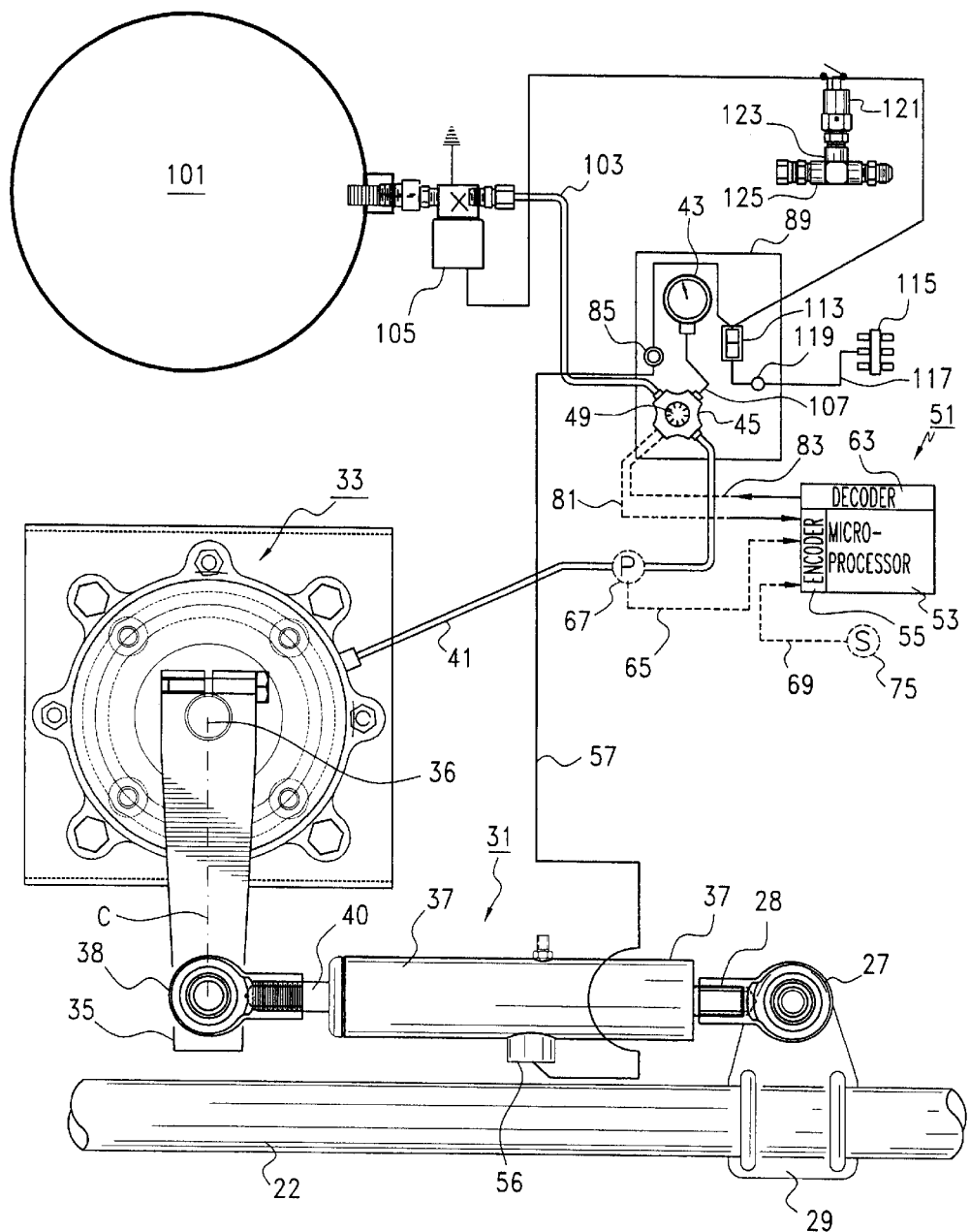
FIG. 2 is a diagrammatic illustration of the fluid and control systems connected to the centering and trim units of FIG. 1.
Figure 7:
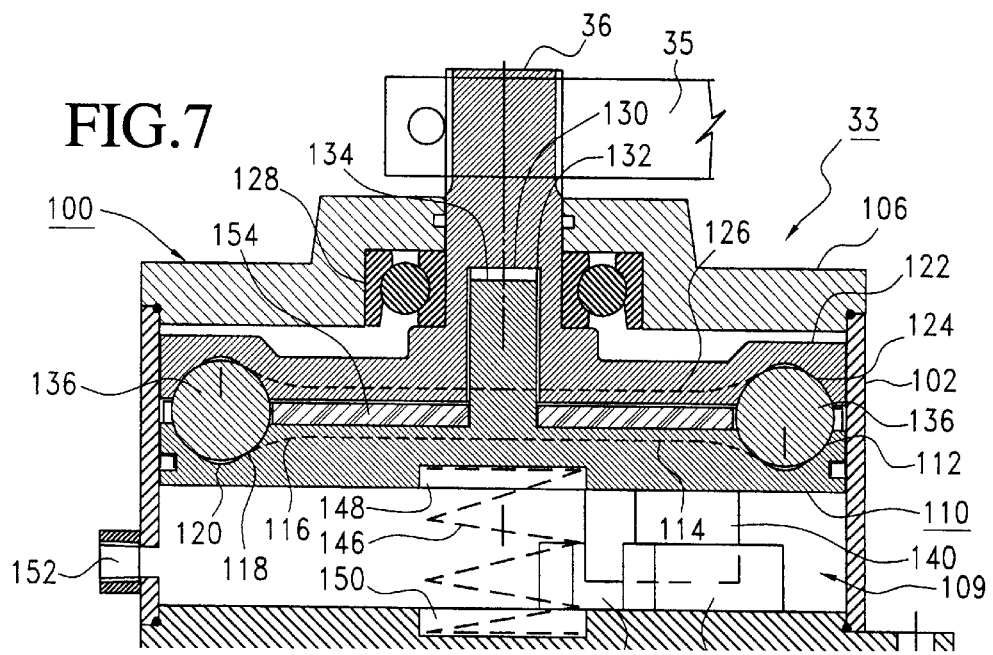
FIG. 7 is an elevational cross-sectional view of the centering unit as taken along line 7—7 of FIG. 6.
Figure 9:
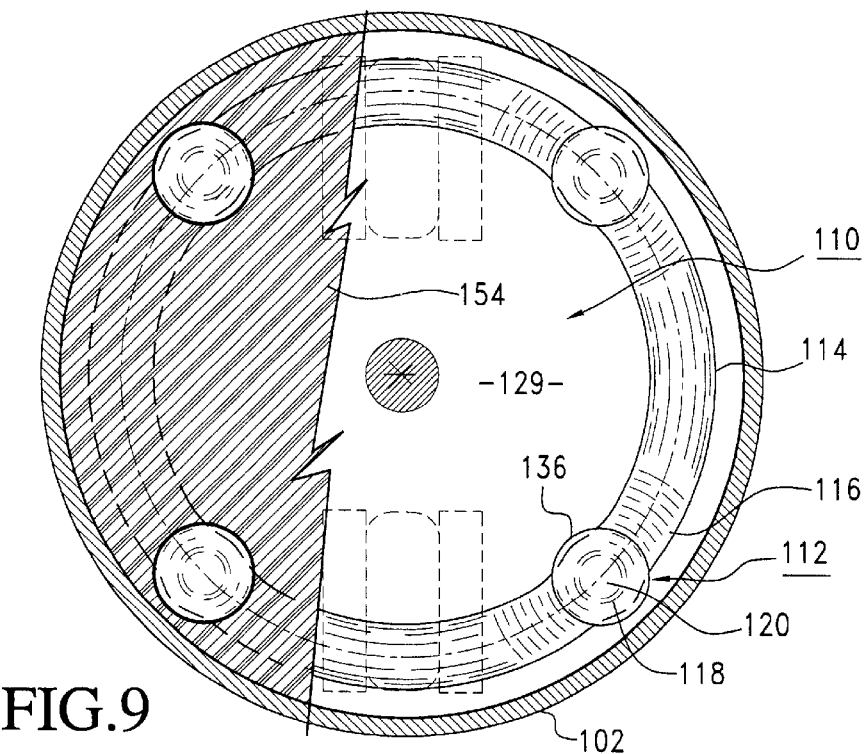
FIG. 9 is a plan and partially fragmentary cross-sectional view of the centering unit as taken along line 9—9 of FIG. 8.

The components of the centering system and the way in which they center and stabilize a vehicle steering system will now be described. It is to be understood that the components described are connected together by appropriately sized fluid conduits and electrical wires and that these conduits and wires are represented by the lines interconnecting the components as shown in the drawings. The resistance unit 33 through the lever 35 and its connecting linkages provides a resistance force resisting movement of the steerable wheels 26 away from a selectable center position, the level of this force being adjustable and dependent upon the amount of fluid pressure supplied to a resistance chamber in the centering unit 33 via a fluid conduit 41 as shown in FIG. 2. The fluid is preferably a gas and the gas pressure control may comprise a manual throttle valve (not shown) upstream of conduit 41, in combination with a pressure gauge 43 to indicate the gas pressure. Alternately, a pressure regulator 45 may be used for maintaining a manually selected system pressure. A selector knob 49 is provided to permit varying the pressure settings of the regulator by hand. By varying the gas pressure in a gas chamber 109 (FIG. 7) by adjustments to pressure regulator 45, the break away resistance and the centering return force produced by the stabilizer of the invention can be increased or decreased as desired. The pressure gauge and the regular may be mounted on a control panel 89, preferably located at or near the driver's station of the vehicle. The range of pressures available should be selected so that break away resistance can be varied from relatively low at low speeds to relatively high at high speeds.

Pressure regulator 45 is connected to a compressed gas source 101 via a conduit 103 containing a solenoid operated cut-off valve 105. The gas pressure in chamber 109 is indicated by the pressure gauge 43, which is connected to pressure regulator 45 by a conduit 107. The gas is preferably air. The electrical components of the control system are activated by an on-off switch 113, which is connected to an electrical bus 115 by a line 117 containing a circuit breaker 119. As it is best to deactivate stabilizer 20 in the event of a failure of the power steering system, a switch 121 for interrupting electrical power to the solenoid valve 105 may be provided for vehicles with power steering systems. Switch 121 is mounted on a pressure sensor 123 located in a hydraulic line 125 in fluid communication with the outlet of the power steering pump (not shown). A loss of pressure at the pump outlet causes switch 121 to open, thereby causing gas supply valve 105 to close in the absence of electrical power to its solenoid.

As an alternative to manual adjustment, the output pressure of regulator 45 may be adjusted by a reversible electric motor (not shown) controlled by an on-board computer 51, which comprises a microprocessor 53, an encoder 55 and a decoder 63. Encoder 55 converts to digital signals an analog signal 65 input from a pressure sensor 67 in the gas supply conduit 41, an analog signal 69 input from a vehicle speed sensor 75, and an analog signal 81 input from a position sensor (not shown) within regulator 45. Decoder 63 converts digital control signals generated by microprocessor 53 to an analog signal 83 for controlling the reversible electric motor which adjusts the output pressure provided by regulator 45. The gas pressure in gas chamber 109 and the resulting resistance and centering forces are thereby made automatically responsive to the speed of the vehicle to provide "speed sensitive stabilizing" of the vehicle's steering system. It may be desirable in some applications that the resistance to turning movements away from the center position be increased automatically as the speed of the vehicle increases because the effects of small off-center movements in response to spurious steering inputs increase dramatically with vehicle speed. The trim unit 31 is also operated remotely by a solenoid 56 in response to a driver of the vehicle pushing a trim button 85 on the control panel 89. Actuation of the solenoid 56 by pushing the button allows the trim rod 40 to move freely relative to the trim cylinder housing 37, thereby permitting a change in the center position of the steerable wheels relative to the centered position of the center lever 35 maintained by the centering unit 33 as explained further below.

Operation of the components of the trim unit 31 will now be described on more detail. As may be seen best in FIG. 3, the trim cylinder housing 37 has an end cap 39 that is integrally formed with the centering rod 28, the outer end of rod 28 being threaded for engagement with corresponding threads of the ball joint 27. At the opposite end of trim cylinder housing 37 is a second end cap 42 for holding in place a trim cylinder head 44, through which passes the trim rod 40. Cap 42 and head 44 carry appropriate seals 76 and 77 to confine hydraulic fluid in the chamber 46 on one side of a trim piston 48. The trim unit 31 includes an intermediate head 50 that incorporates a trim valve assembly 52. Trim valve assembly 52 comprises a valve member 54 on a plunger 96 actuated by the solenoid 56 in response to a driver of the vehicle pushing the trim button 85 on the control panel 89, which is preferably located at or near the driver's station of the vehicle.

A trim cylinder housing 37 encloses two separate interior cylinders 60 and 61, the inner ends of which are connected together by the intermediate head 50, which includes circumferential head seals 78, 78 and 79, 79. The cylinder 60 contains the trim piston 48 and cooperates with this piston to define the two hydraulic chambers 46 and 47. The piston 48 is keyed and fastened to the inner end of the trim rod 40, such that the pressure differences between the fluid in chambers 46 and 47, respectively, cause piston and trim rod movement. An annular conduit 62 is provided between the exterior of cylinder 60 and the interior of housing 37, a port 64 is provided in end head 44, and passages 66 and 68 are provided in intermediate head 50, so that fluid flow paths are available between chambers 46 and 47 when solenoid valve 52 is in its open position. Check valves 71, 72, 73 and 74 are provided in the flow of passages of intermediate head 50 so that fluid can flow only one way from chamber 46 to chamber 47 when trim rod 40 is being extended, and can flow only one way from chamber 47 to chamber 46 when trim rod 40 is being contracted.

The passages 66, 68, 92, 90, 93, 94 and 95 are formed within the intermediate head 50 and are shown diagrammatically in FIG. 5 since they cannot all be readily shown in a cross-sectional view such as FIG. 3. Passage 93 is connected to trim chamber 46 through an annular conduit and a head port (not shown) similar to the annular conduit 62 and the head port 64 that connect chamber 46 to passage 66. As illustrated in FIGS. 4 and 5, the valve element 54 is mounted on the inner end of the reciprocating plunger 96 of valve assembly 52 and is pulled away from a valve seat member 97 in head 50 against the tension of a spring 99 upon actuation of the solenoid 56 by the pushing of trim button 85. Positioned between valve seat member 97 and head 50 is an annular filter member 98 for filtering fluid passing through the valve from passage 95 to passage 90.

To ensure that the hydraulic chambers 46 and 47 are kept completely filled with hydraulic fluid in the event of leakage past the rod and head seals 76, 77, 78 and 79, the inner cylinder 61 defines a hydraulic reservoir 82 containing a pressure piston 87 that is pressed against hydraulic fluid in reservoir chamber 82 by a compression spring 84, which preferably has sufficient compression to provide at least about 40 psig pressure in chamber 82. Chamber 82 is filled with hydraulic fluid through a servicing fixture 86 containing a check valve 88. Servicing fluid introduced through fixture 86 passes through check valve 88 and a passage 94 into chamber 82, reverse flow out of chamber 82 through fixture 86 being prevented by the check valve. Passages 92 and 93 allow any makeup of fluid needed to pass from chamber 82 into either of trim chambers 46 and 47 independent of solenoid valve 52. The solenoid 56 of valve 52 is energized to its open position by the electrical line 57 from the driver's control station.

For sealingly engaging trim cylinder 60, trim piston 48 carries two sets 80,80 of dual circumferential seals. Although not specially shown, each set may comprise an outer seal of square cross section concentrically stacked on a more resilient seal of oval cross section to provide a close tolerance seal arrangement for substantially preventing any leakage past the trim piston. These multiple seals preclude any significant drift of trim piston 48 away from its locked position for setting the on-center position of the centering detents 112 and 124. Also provided is a wear band 81. A similar close tolerance circumferential seal 80' and a similar wear band 81' are also preferably provided on the reservoir piston 87.

With reference to FIG. 5, the remotely controlled trim unit 31 operates as follows. If there is a roadway pull to the right, straight ahead travel will require a compensating steering force to the left from the steering wheel to move the bearing members slightly away from their seated positions in the detents. Such movement of the bearing members produce a differential pressure across trim piston 48 in trim cylinder 60. While holding the steering wheel in the position giving straight ahead travel, the trim button 85 is pushed momentarily to briefly open solenoid valve 52 as shown in FIG. 4, which allows fluid to be discharged from trim chamber 46 and supplied to trim chamber 47 such that cylinder housing 37 moves to the right and the differential pressure across trim piston 48 is removed by equalizing the pressures in trim chambers 46 and 47. The force moving housing 37 is provided by the return forces generated by the bias tending to return each of the bearing members to their seats in the detents. The movement of trim piston 48 in trim cylinder 60 causes each of the bearing members to be reseated in their rest or seated positions in the detents. After its momentary actuation, the trim button 85 is then released to close solenoid valve 52 and thereby lock trim piston 48 in its changed position corresponding to a new on-center position in which the detent seats are realigned with their corresponding bearing members. This new on-center position will then maintain the vehicle steering system in a newly centered condition, which provides straight ahead travel of the vehicle that is free from the previously experienced roadway pull to the right and will be maintained even when the steering wheel is released.

Fluid flowing out of chamber 46 follows a return flow path to reservoir 82 through passages 66, 95 and 90 and valves 71 and 52. Fluid supplied to trim chamber 47 follows a supply flow path from reservoir 82 through passage 92 and valve 74. Similarly, a compensating steering force to the right with the trim button 85 pushed causes fluid to be discharged from trim chamber 47 and supplied to trim chamber 46 such that cylinder housing 37 moves to the left. Fluid flowing out of chamber 47 follows a return flow path to reservoir 82 through passages 68, 95 and 90 and valves 73 and 52. Fluid supplied to trim chamber 46 follows a supply flow path from reservoir 82 through passage 93 and valve 72.

Figure 6:
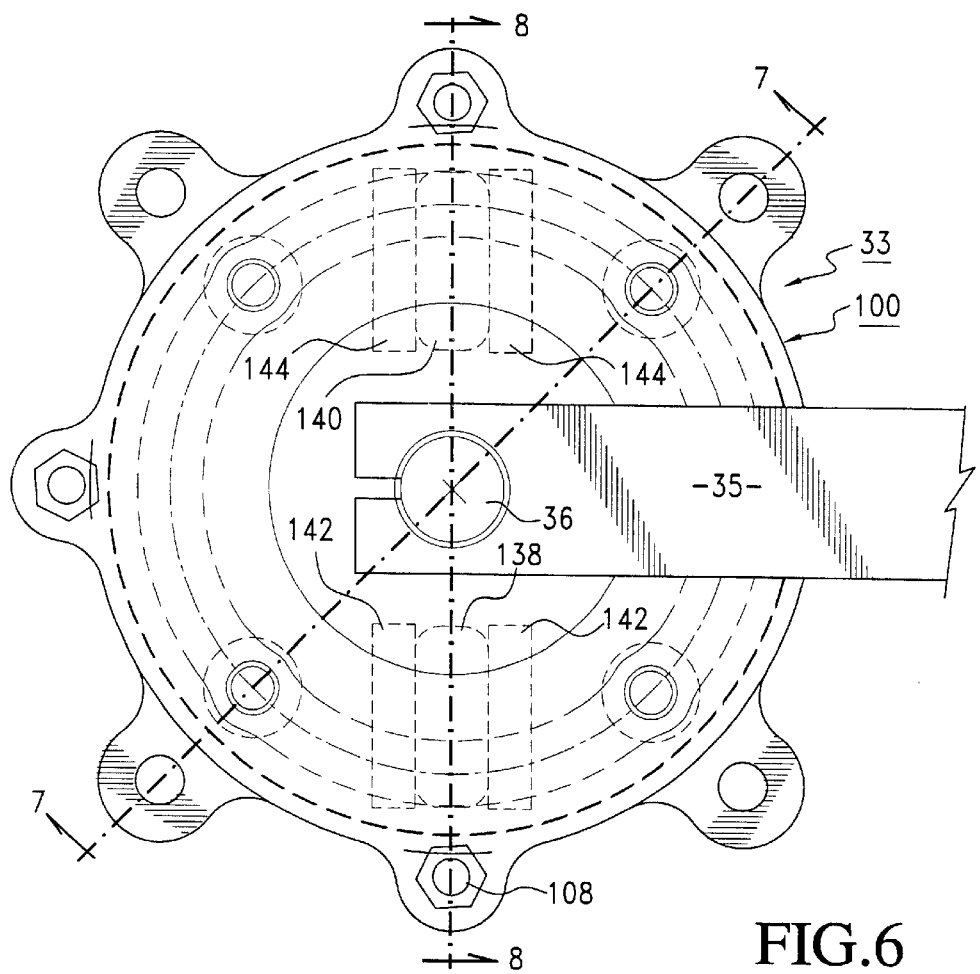
FIG. 6 is an exterior plan view of the centering unit shown as rotated counterclockwise by 90 degrees relative to its orientation in FIG. 2.

Referring now to FIGS. 6, 7, 8 and 9, there is shown the resistance unit 33 with its components in their rest or centered positions. The resistance unit 33 has a housing 100 comprising a resistance cylinder 102 held between a base 104 and a cover 106 by a plurality of bolts 108 (FIG. 6). Arranged for reciprocal movement within the resistance cylinder 102 is a piston detent plate 110 having a detent generally designated 112, and a lower ball track 114. The detent 112 comprises a ramp 116, a seat band 118, and undercut bottom 120, the details of which are described further below. Integrally formed with shaft 36 at its base is a rotary detent plate 122 having an upper ball track 126 and a detent 124 with a ramp 131. The detent 124 and track 126 are substantially identical to the lower detent 112 and the lower track 114 so that only the details of the lower detents and the lower tracks will be described hereinafter.

Figure 8:
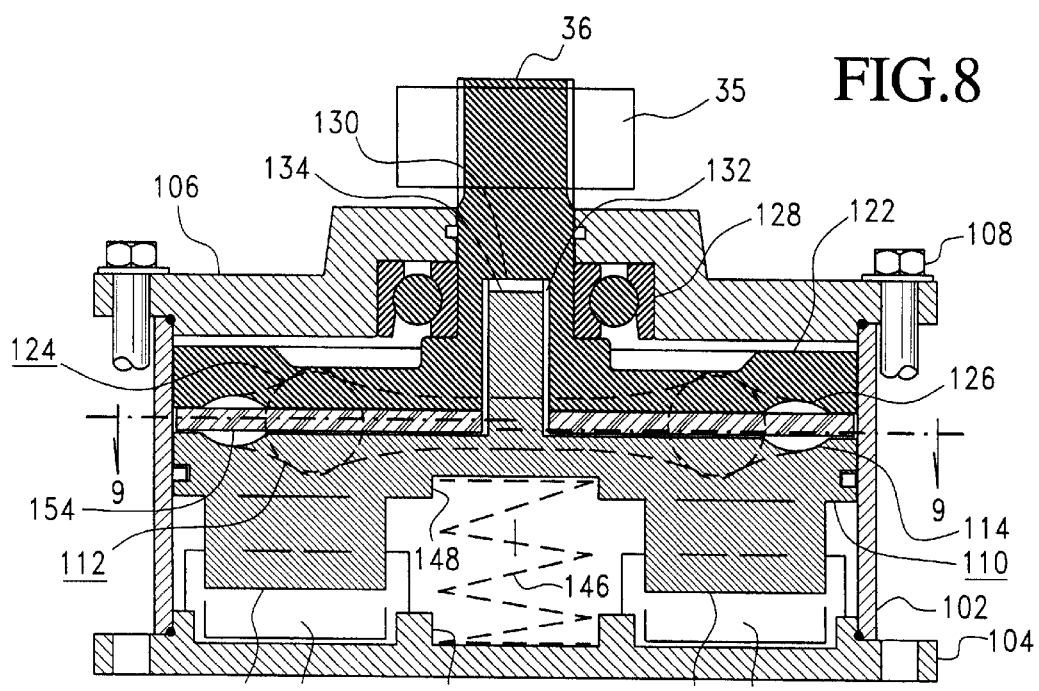
FIG. 8 is an elevational cross-sectional view of the centering unit as taken along line 8—8 of FIG. 6 and shows the unit in its centered or rest position.

Passing through a central portion of detent plate 122 and into the lower end of shaft 36 is a guide bore 130 containing a sleeve bushing 132 for receiving a guide pin 134 formed integrally with and upstanding from a central portion of piston detent plate 110. Guide pin 134 engages bushing 132 during reciprocal movement of detent plate 110 in response to movement of a plurality of ball bearing members 136 out of their corresponding detents in piston plate 110 and rotary plate 122. The piston detent plate 110 is held against rotary movement by means of a pair of depending lugs 138 and 140, which respectively slide between a pair of ears 142 and a pair of ears 144 upstanding from the housing base 104. Centering chamber 109 also contains a compression spring 146 positioned by a recess 148 on the underside of piston plate 110 and a recess 150 in the housing base 104. The compression spring 146 provides enough upward pressing force against piston plate 110 to hold both it and the bearing members 136 in their proper positions at all times. The spring force provided by spring 146 in many cases is not sufficient to provide the desired turning resistance represented by the resistance of the ball bearings to movement out of their corresponding detents, so that the force of spring 146 is preferably supplemented by providing a pressurized fluid in fluid chamber 109 through a fluid port 152. Also provided is a bearing spacer 154 for maintaining the spacing between the ball bearings 136 the same as the spacing between the detents when the ball bearings move away from their seated positions in the detents during rotation of the detent plate 122 in response to turning movements of the vehicle steering system as transmitted through the lever 35 and the shaft 36. The rotary plate 122 rotates about the rotational axis of shaft 36 and its movement along this axis is prevented by a thrust bearing 128 as shown in FIGS. 8 and 11.

Figure 10:
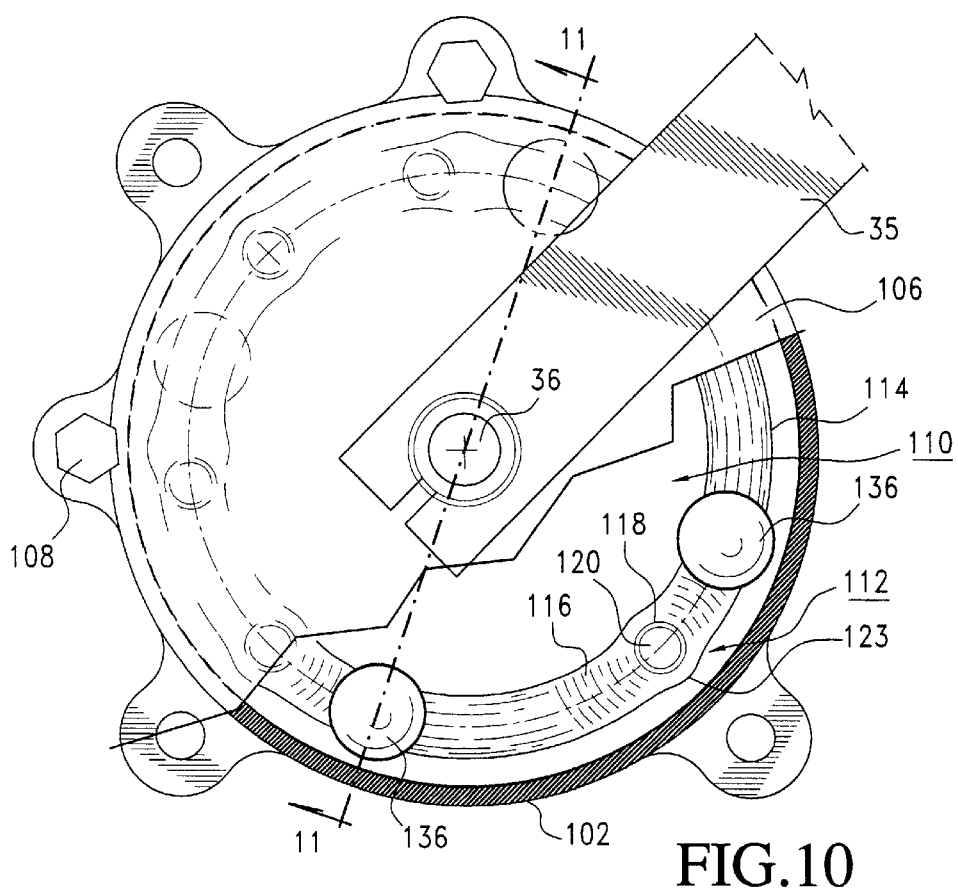
FIG. 10 is a plan and partially fragmentary view showing the centering unit in a moved position relative to the rest position of FIG. 8.
Figure 11:
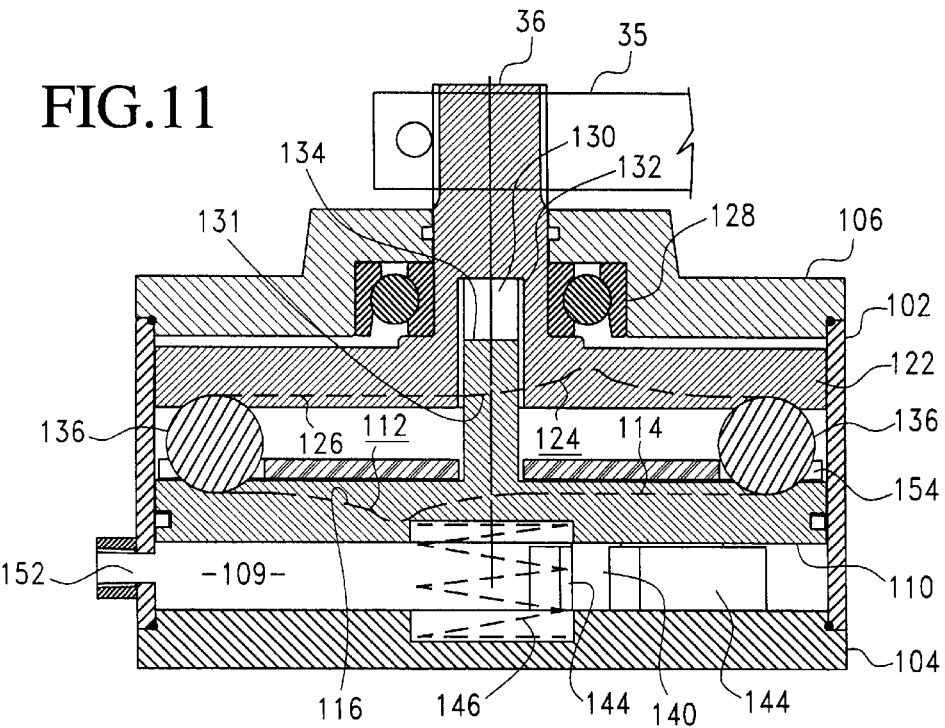
FIG. 11 is an elevational cross-sectional view of the centering unit as taken along line 11—11 of FIG. 10.

FIGS. 10 and 11 illustrate a moved position of the resistance unit 33 in response to a turning movement of the vehicle. In these views, the ball bearings 136 have moved to the end of their respective ramps 116 and 131 away from the seat bands 118, such that the balls will thereafter move along the lower ball track 114 and the upper ball track 126 upon further turning movement of the vehicle. As the ball bearings 136 progress along the ramps 116 and 131 away from their respective seat bands 118, the piston plate 110 and its depending lugs 138 and 140 move from the positions shown in FIG. 8 to the depressed positions shown in FIG. 11. The movement of the ball bearings 136 out of the detents 112 and 124 is driven by rotation of the rotary plate 122 with its ramp 131 in firm frictional engagement with the ball bearings. This firm engagement is provided by forming the ramps 116 and 131 and the tracks 114 and 126 as a groove having substantially the same radius as the ball bearings, which will be explained further below. The breakaway turning force required to initiate ball movement away from seat bands 118 and to maintain ball movement along ramps 116 and 131 are functions of both the slope of the ramps 116 and 131 and the compression force applied to the balls by the fluid pressure in chamber 109. Although ball tracks 114 and 126 may also have some amount of slope to provide continuing resistance through all turning angles, it is preferred in many applications that the tracks 114 and 126 be substantially without slope (flat), such that piston plate 110 does not move further away from rotary plate 122 as the balls travel along these tracks.

Figure 12:
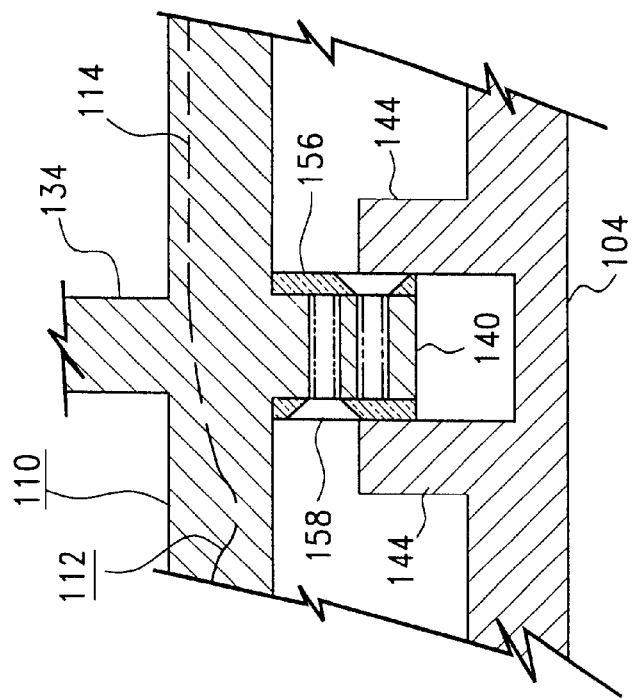
FIG. 12 is an enlarged fragmentary view showing details of a piston guiding feature when the centering unit is in the rest position of FIG. 8.
Figure 13:
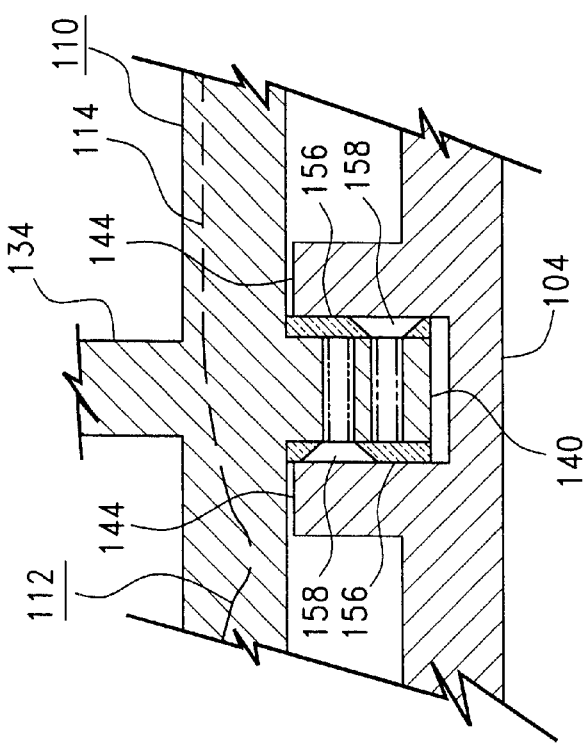
FIG. 13 is an enlarged fragmentary view showing details of the piston guiding feature when the centering unit is in the moved position of FIG. 10.
Figure 19:
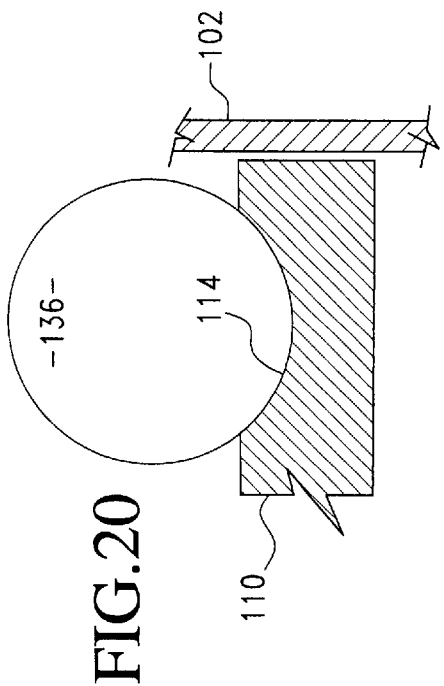
FIG. 19 is an enlarged cross-sectional view of the piston plate face taken along line 19—19 in FIG. 15 and also shows a ball bearing member at an intermediate position along a ramp segment of its detent.
Figure 20:
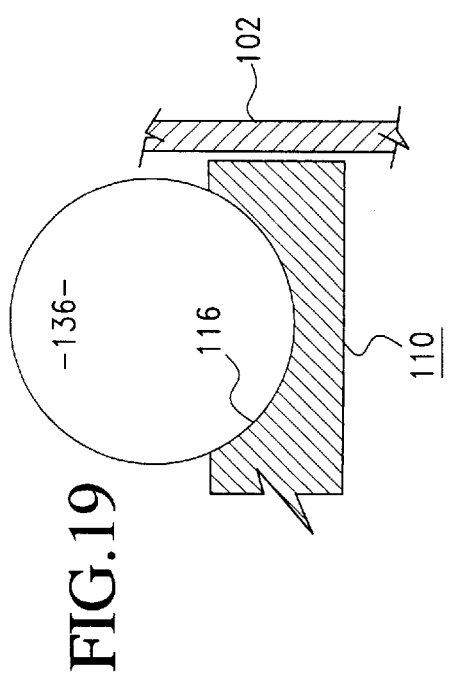
FIG. 20 is an enlarged cross-sectional view of the piston plate face taken along line 20—20 in FIG. 15 and also shows a ball bearing member entering its track at the upper end of its detent ramp; and, FIG. 21 is an elevational cross-sectional view of the piston plate similar to FIG. 16 showing dimensional details of a detent relative to its ball member.

As shown in FIGS. 12 and 13, it is preferable that the depending lugs 138 and 140 have an exterior shim 156 secured to their opposite exterior faces by pairs of recessed screws 158, 158. The shims 156, 156 are preferably made of a low friction material such as brass or a hard plastic, and are machined or otherwise formed to provide a close tolerance sliding fit relative to the retaining ears 142, 142 and 144, 144 carried by the housing base 104.

In FIGS. 14–21, there are shown structural details of the detent 112 and the ball track 114 in piston plate 110, which are substantially identical to the details of the detent 124 and the ball track 126 of the rotary plate 122. FIG. 15 is a blow-up of the segment of piston plate 110 identified by the broken line circle 15 in FIG. 14. As shown by the transverse cross-sections illustrated in FIGS. 19 and 20, both the ramp 116 and the track 114 are formed by a groove cut on substantially the same radius as the radius of the ball member 136 to provide a snug frictional fit between the ball member and the ramp and track. This snug frictional fit ensures that rotation of the rotary plate 122 relative to the piston plate 110 will cause the ball member to smoothly and consistently ride up the ramp 116 and out of the detent onto the ball track 114, even under relatively high compressive loads between plates 110 and 122 with fluid pressures in chamber 109 as high as 100 psig.

As shown in FIGS. 15–18 and 21, a seat band 118 is provided around the rim of an undercut bottom portion 120 of the detent 112. The width of band 118 is preferably machined to be a flat or slightly convex surface tangent to the curvature of the ball member so that when the ball member is fully seated in the detent, it's outer curved surface rests against the seat band 118 substantially along a line of contact represented by the broken line 160 in FIG. 17. To ensure such a line of contact and to minimize wear at the upper edge of band 118, the surface of this band may have a slight convex curvature across its width instead of a straight line width.

Referring now to FIG. 18, the opposite sidewalls 123, 123 adjacent to the seat band 118 are cut on a radius R1 that is slightly greater than the radius R of the ball 136 to provide a gap G between the surface of the ball and the surface of the adjacent sidewalls. This gap G insures that the line of contact 160 between the ball and the seat band 118 extends completely around the seat band when the ball is fully seated in the detent 112. By reason of the cut of sidewalls 123, 123, the bottom of ramp 116 intersects these sidewalls along an imaginary line 125 as seen best in FIG. 15. The top of ramp 116 intersects the adjacent track 114 along an imaginary line 127 as also shown in FIG. 15.

Figure 21:
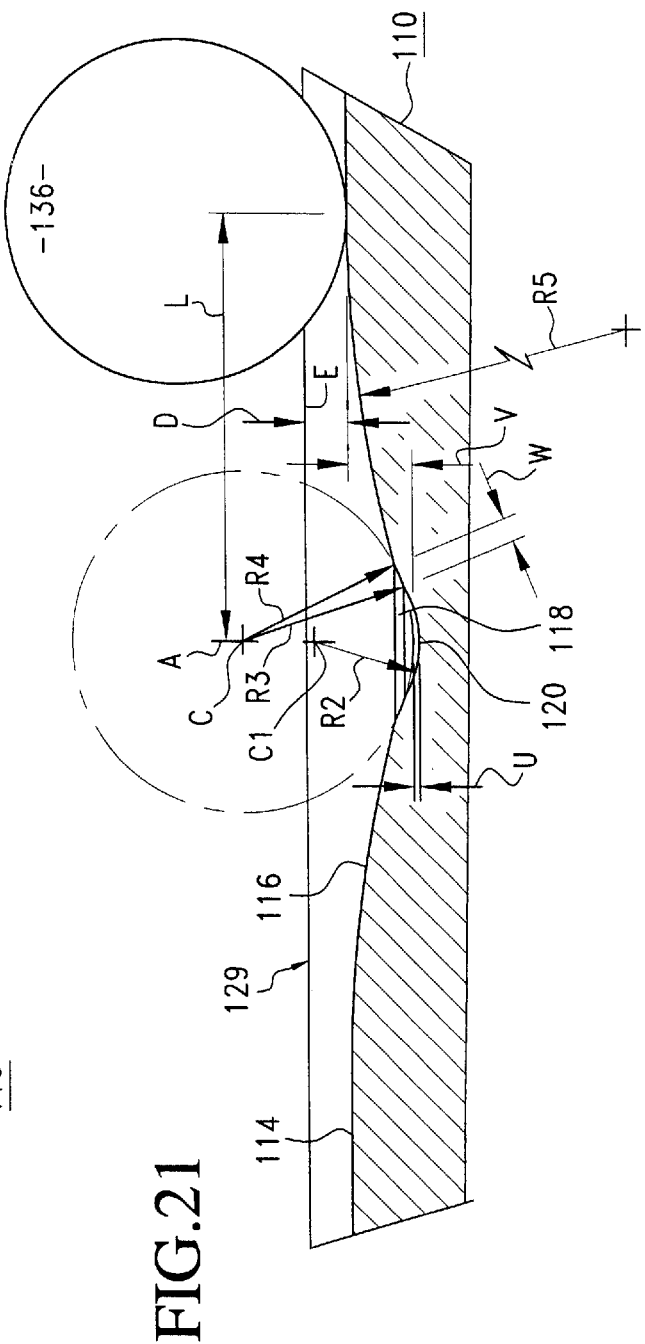

An illustrative example of one way in which the band 118 and undercut 120 may be formed is illustrated in FIG. 21. In this figure, R2 represents the radius of the undercut, such as 5/16 inch, and R3 and R4 each represent the radius of the ball, such as ½ inch. Also shown is a vertical imaginary axis A that passes through the center C1 of the undercut and the center C of the ball. To establish the upper and lower limits of the band 118, R3 is drawn at an angle of 19 degrees from the vertical axis A and R4 is drawn at an angle of 27 degrees from the vertical axis A, so that the band width W covers an arc of 8 degrees. These illustrative dimensions yield an undercut 120 with its bottom at a distance U of about 0.045 inch below the bottom of the seated ball, and a band width at W of about 1/16 inch. Where E represents the edge of the groove at the late surface 129, the bottom of the seated ball may be 5/16 inch below the edge E, and the bottom or depth D of the groove of track 114 may be ⅛ inch below the edge E to give a vertical rise V of 3/16 inch as the ball moves from its seated position on the band 118 to its position in the track 114 at the top of the ramp 116. In this case, the horizontal distance L over which the ball travels while on ramp 116 may be about 1.25 inches, and the sloped ramp surface may have a convex shape defined by a radius R5 of about 4 inches.

If the diameter of piston member 110 is about 7.0 inches, the air chamber 109 of centering unit 33 may be pressurized by air to a pressure of, for example, about 40 psig to provide a linear resistance force of about 320 pounds as measured at the tie rod 22 for opposing off-center movement of the steerable wheels. An air pressure of about 65 psig will provide about the same resistance force with about a 6 inch diameter piston. Since many conventional steering system geometries provide a linear resistance force of about 15 to 20 pounds as measured at the tie rod, the present invention may be used to increase the resistance and re-centering forces of these steering systems by a multiple of about 5 to about 30 or more, preferably about 10 to about 25. A resistance force of 300 pounds or more is particularly effective in eliminating the adverse effects of crosswinds on large vehicles.

The particularly important trimming feature of the invention may be achieved through drive means other than the hydraulic trimming unit 31. For example, movement of trim rod 40 may be accomplished by controllably varying its position with a reversible electric motor pivotally mounted on the vehicle axle 21 in place of trimming unit 31. Such trimming arrangements are described in my prior U.S. Pat. No. 4,418,931 and U.S. Pat. No. 4,534,577 which are incorporated herein by reference. However, the piston and cylinder trimming arrangement shown in the drawings is preferably for its simplicity and its precision and ability to provide remote trimming responsive to steering wheel movement.

It is also important to recognize that the centering stabilizers of the present invention engage the vehicle steering system at a location between the steerable wheels and the steering gear assembly from which extends the pitman arm. As a result, spurious inputs from the steering column and/or from a power steering unit are absorbed by the stabilizer before these inputs can reach the steerable wheels. Likewise, spurious forces transmitted from the roadway are immediately absorbed in the stabilizer, rather than being transmitted through the entire steering assembly before encountering any stabilizing resistance from the steering wheel. As a result, the centering stabilizer protects the interior components of the steering assembly from the wear caused by repeated oscillations between states of tension and compression.

In the operation of roadway motor vehicles, spurious inputs may be caused by road forces acting on the vehicle wheels, environmental forces acting on the vehicle body, driver forces acting on the steering wheel, off-center bias inherent in the steering system itself, or any combination of one or more of these forces. Without the power centering stabilizer of the present invention, such spurious steering forces of relatively small magnitude can cause vehicle steering systems to move to one side or the other of center or to oscillate back and forth from one side to the other, thereby producing corresponding movements of the vehicle away from the desired direction of vehicular travel. The invention also may be used with other tie rod arrangements and with steering systems that do not require tie rod arrangements, such as those with only one steerable member, such as the rudder of a ship or an airplane.

The variable resistance and return force components of the invention can be used alone as a centering unit without the remote trimming features. On the other hand, the remote trimming features of the invention are useable not only with the centering unit disclosed herein, but also in combination with centering mechanisms of the prior art. Thus, the remotely operable trimming unit of the present invention can be combined with centering devices of known types to provide adjustment of the center position during vehicle operation.

The invention can be used on vehicles with or without power steering systems. The invention can provide centering compensation for the steering system of a wide variety of vehicles, including automobiles, trucks, motorcycles and other on the highway and off the highway motor vehicles, and also small boats, large ships, and aircraft. The invention also has a wide range of other industrial applications and can be utilized to automatically center any device having a steering member interconnected by suitable linkages to a steerable member.

The resistance components or remote trimming components of the present invention may be combined with one or more such components of the prior art, such as those disclosed in my prior U.S. Pat. Nos. 4,410,193; 4,418,931; 4,534,577; 5,527,053; 5,536,028; 6,003,887; and 6,267,395, the entire contents of each of these patents being expressly incorporated herein by reference. These components also may be combined with one or more features of U.S. patent application Ser. No. 09/699,520 on a Center Holding Assembly For Vehicle Steering Systems, the entire contents of which is incorporated herein by reference. As a further example, the remotely operable resistance unit of the invention can be combined with remote trimming devices of known types to provide adjustment of the center position during vehicle operation. In addition, a number of other modifications to both the variable resistance components and to the trimming components specifically disclosed are possible without departing from the scope of the invention as defined by the claims set forth below.

What is claimed is:

1. A steering control apparatus for a steering system of a vehicle having at least one steerable member movable away from a preselected center position in response to a steering force, the apparatus comprising:

a rotary member mounted for rotation about an axis and having a corresponding face with at least one centering detent;

a piston member having a corresponding face arranged opposite to the rotary member face with a centering detent aligned with the rotary member detent when the rotary member is in a centered position corresponding to the preselected position of the steerable member, each of the piston member and rotary member detents comprising a seat and a ramp sloped away from the seat toward said opposing faces;

at least one bearing member arranged to be pressed between the rotary and piston members and to be in contact with the seat of each of the aligned centering detents when the steerable member is in the preselected position, each ramp being formed by a groove having substantially the same radius as the bearing member to provide a snug fit and firm frictional engagement for driving the bearing member out of the seats and along the ramps upon rotation of the rotary member;

connecting means for rotating the rotary member relative to the piston member in response to movement of the steerable member away from the preselected position; and, compression means for pressing together the piston and rotary members so that contact pressure between the bearing member and the seats of the aligned centering detents resists relative movement between the rotary member and the piston member and prevents substantial movement of the steerable member away from the preselected position until the steering force exceeds a predetermined value.

2. The apparatus of claim 1 further comprising adjusting means operable for varying the contact pressure between the bearing member and the aligned detents so as to vary the amount of steering force required for substantial movement of the steerable member away from the preselected position, and control means for remotely operating the adjusting means so as to selectively vary the amount of the contact pressure while the vehicle is in operation.

3. The apparatus of claim 2 in which the compression means includes resilient means for providing a resilient force pressing together the piston member and the rotary member, and in which the adjusting means includes varying means for selectively varying the amount of the resilient force.

4. The apparatus of claim 3 in which the resilient means provides the resilient force in response to compression of the resilient means, and in which the varying means selectively varies the amount of the compression.

5. The apparatus of claim 2 in which the compression means includes a pressurized fluid for biasing the piston member toward the rotary member, and in which the adjusting means includes fluid means for varying the pressure of the fluid to change the amount of contact pressure provided against the bearing member by the rotary and piston members.

6. The apparatus of claim 1 in which the bearing member has a first radius of curvature and the seat of each of the centering detents is formed by an undercut segment having a second radius of curvature substantially smaller than the first radius of curvature so that contact between the bearing member and each centering detent occurs along a rim portion of the undercut segment, the rim portion having a shape providing substantially a line of contact between the bearing member and each centering detent.

7. The apparatus of claim 6 in which a surface of the rim portion is in the form of a band having a width formed as a straight or convex surface for contacting the bearing member at a tangent toits curved surface.

8. The apparatus of claim 6 wherein each seat comprises opposite sidewalls having a third radius of curvature greater than the first radius of curvature such that the bearing member does not contact the sidewalls when the bearing member is in the seats.

9. The apparatus of claim 1 further comprising trim means operable for varying the preselected position of the steerable member; and control means for remotely operating the trim means so as to selectively vary the preselected position of the steerable member while the vehicle is in operation.

10. The apparatus of claim 9 for a steering system having at least one steerable member movable relative to a vehicle member, and in which the connecting means includes linkage means for connecting the rotary member to the vehicle member at a first point of connection and for connecting the rotary member to the steering system at a second point of connection in spaced relation to the first point of connection, the spaced relation defining a centered distance when the steerable member is in the preselected position; the trim means including drive means operable for causing the linkage means to vary the centered distance, and the control means including means for remotely operating the drive means so as to selectively vary the centered distance while the vehicle is in operation.

11. The apparatus of claim 1 wherein the rotary member rotates about a rotational axis and movement along the axis is prevented by thrust bearing means.

12. The apparatus of claim 1 wherein each ramp extends from the respective seat to a track in the respective corresponding face having no inclination or an inclination different from that of the ramp, and the track is formed by a groove having substantially the same radius as the bearing member.

13. The apparatus of claim 12 wherein each of the detents comprises two of the ramps and two of the tracks one each on opposite sides of the respective seat.

14. The apparatus of claim 1 in which the connecting means includes a centering lever connected to the rotary member and movable with the steerable member to either side of a centered position relative to a vehicle member corresponding to the preselected position of the steerable member, and trim means for changing the centered position of the centering lever relative to the vehicle member so as to selectively vary the preselected position of the steerable member while the vehicle is in operation.

15. The apparatus of claim 14 in which the trim means includes drive means for causing trimming movement of the centering lever in response to at least one remote input so as to change the centered position while the vehicle is in operation, and control means for selectively providing the at least one remote input to the drive means from a location remote to the trim means.

16. The apparatus of claim 1 comprising a plurality of bearing members, and wherein the rotary and piston members each have a plurality of centering detents one for receiving each of the plurality of bearing members.

17. The apparatus of claim 1 comprising a plurality of the bearing members arranged in spaced relation to each other, and spacer means for retaining the bearing members in the spaced relation, the rotary and piston members each having a plurality of centering detents one for receiving each of the bearing members, and the centering detents having a spaced relation corresponding to the spaced relation of the bearing members.

18. The apparatus of claim 1 in which the connecting means includes linkage means for connecting the rotary member and the steerable member, the linkage means comprising a first member and a second member movable relative to each other between a retracted position and an extended position; and means for locking the first and second members in a fixed position relative to each other when the bearing member is in the detent seats.

19. The apparatus of claim 1, wherein the compression means comprises fluid means for providing a pressurized fluid to bias the piston member toward the rotary member, adjusting means for varying the pressure of the fluid to change the amount of contact pressure provided against the bearing member by the rotary and piston members, and spring means for biasing the piston member toward the rotary member so that contact pressure between the bearing member and the centering detents is maintained in the absence of the fluid pressure.

20. The apparatus of claim 1 wherein the detent ramps have a sloped surface with a convex shape.

* * * * *